United States Patent
Yamagami

(10) Patent No.: US 7,275,100 B2
(45) Date of Patent: Sep. 25, 2007

(54) FAILURE NOTIFICATION METHOD AND SYSTEM USING REMOTE MIRRORING FOR CLUSTERING SYSTEMS

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 827 days.

(21) Appl. No.: 09/760,345

(22) Filed: Jan. 12, 2001

(65) Prior Publication Data

US 2002/0095489 A1    Jul. 18, 2002

(51) Int. Cl.
*G06F 15/173* (2006.01)
*G06F 11/00* (2006.01)

(52) U.S. Cl. .............. 709/224; 709/226; 709/213; 714/6

(58) Field of Classification Search ........... 709/204, 709/206, 207, 220, 221, 222–227, 230, 237, 709/242–244, 204.213, 216–219
See application file for complete search history.

(56) References Cited

U.S. PATENT DOCUMENTS 5,459,857 A   10/1995   Ludlam et al. ........ 395/182.04

(Continued)

FOREIGN PATENT DOCUMENTS

EP    0 981 091 A2    2/2000

(Continued)

OTHER PUBLICATIONS

Phil Lewis, "A High Availability Clustering Solution", Linux Journal, vol. 1999, Issue 64es, ISSN:1075-3583, (Aug. 1999).*

(Continued)

*Primary Examiner*—Rupal Dharia
*Assistant Examiner*—Yasin M. Barqadle
(74) *Attorney, Agent, or Firm*—Sughrue Mion, PLLC.; Pavel Pogodin, Esq.

(57) ABSTRACT

A cluster computing system, comprises: a production host group; a standby host group coupled to the production host group by a network; and a remote mirror coupled between the production host group and the standby host group, the remote mirror including a production site heartbeat storage volume (heartbeat PVOL) and a standby site heartbeat storage volume (heartbeat SVOL) coupled by a remote link to the heartbeat PVOL, with the production host group configured to selectively send a heartbeat signal to the standby host group by use of at least one of the network and the remote link. A method of checking for failure in a cluster computing system, comprises: generating a heartbeat signal from a production host group; selectively sending the heartbeat signal to the standby host group from the production host group by use of at least one of a network and a remote link; and enabling the standby host group to manage operations of the cluster computing system if an invalid heartbeat signal is received by the standby host group from the production host group.

16 Claims, 10 Drawing Sheets

System Configuration

U.S. PATENT DOCUMENTS

| | | | |
|---|---|---|---|
| 5,526,358 A * | 6/1996 | Gregerson et al. | 709/221 |
| 5,544,347 A | 8/1996 | Yanai et al. | 395/489 |
| 5,561,825 A | 10/1996 | Yamagami et al. | 395/878 |
| 5,592,630 A | 1/1997 | Yamagami et al. | 395/250 |
| 5,933,653 A | 8/1999 | Ofek | 395/826 |
| 6,006,206 A * | 12/1999 | Smith et al. | 705/35 |
| 6,044,444 A | 3/2000 | Ofek | 711/162 |
| 6,370,656 B1 * | 4/2002 | Olarig et al. | 714/23 |
| 6,393,485 B1 * | 5/2002 | Chao et al. | 709/231 |
| 6,438,705 B1 * | 8/2002 | Chao et al. | 714/4 |
| 6,526,521 B1 * | 2/2003 | Lim | 714/4 |
| 6,553,401 B1 * | 4/2003 | Carter et al. | 709/200 |
| 6,643,795 B1 * | 11/2003 | Sicola et al. | 714/6 |

FOREIGN PATENT DOCUMENTS

| | | |
|---|---|---|
| WO | WO98/59291 | 12/1998 |
| WO | WO 00/07105 | 2/2000 |

OTHER PUBLICATIONS

Tim Burke, "High Availability Cluster Checklist", Linux Journal, vol. 2000, Issue 80es, ISSN:1075-3583, (Nov. 2000).*

* cited by examiner

System Configuration

| | | |
|---|---|---|
| Network Heartbeat Enable | Enable | 200 |
| Remote Group Status | Alive | 210 |
| Remote Copy Heartbeat Enable | Enable | 220 |
| Remote Group Status | Alive | 230 |
| 240a — Device Address (1) | /dev/c1t1d2 | 240 |
| 241a — Device Status (1) | Enable | 241 |
| 240b — Device Address (2) | /dev/c1t1d3 | 240 |
| 241b — Device Status (2) | Enable | 241 |
| ... | ... | |
| 240c — Device Address (n) | NULL | 240 |
| 241c — Device Status (n) | Disable | 241 |

Heartbeat Status Table 250

FIG. 2

| | | |
|---|---|---|
| Serial Number | 421014 | 310 |
| Time | 18:31 | 320 |
| Identifier | 400104 | 330 |

Heartbeat Message 300

FIG. 3

Installing Mirror Volumes for Heartbeat

De-installing Mirror Volumes for Heartbeat

Sending Heartbeat Message (Heartbeat Check 101a)

Receiving Heartbeat Message (Heartbeat Check 101b)

FIG. 8  Setting a Heartbeat Checking Method

System Configuration

FAILURE NOTIFICATION METHOD AND SYSTEM USING REMOTE MIRRORING FOR CLUSTERING SYSTEMS

FIELD OF THE INVENTION

The present invention relates to cluster computing systems, and relates more particularly to systems and methods for providing heartbeat-checking mechanisms by use of remote mirror technology for cluster computing systems. The present invention permits a host on a primary site to send heartbeat signals to a host on a secondary site (and vice versa) by use of remote mirror technology.

BACKGROUND OF THE INVENTION

"Clustering" is the known technique of connecting multiple computers (or host servers) and enabling the connected computers to act like a single machine. Clustering is used for parallel processing, for load balancing, and for fault tolerance. Corporations often cluster servers together in order to distribute computing-intensive tasks and risks. If one server in the cluster computing system fails, then an operating system can move its processes to a non-failing server in the cluster computing system, and this allows end users to continue working while the failing server is revived.

Cluster computing systems are becoming popular for preventing operation interruptions of applications. Some cluster computing systems have two groups of hosts (e.g., servers), wherein one host group works as the production system, while the other host group works as the standby system. One host group is typically geographically dispersed (e.g., several hundred miles) from the other host group. Each host group has its own associated storage system (e.g., a disk system). These two storage systems typically implement remote mirroring technology which is discussed below. Therefore, the associated storage system connecting to the standby host group contains the same data as the associated storage system connecting to the production host group.

The network connecting two host server groups is typically a Wide Area Network (WAN), such as the Internet. WANs are not typically reliable since WANs are often subject to failure. Transfer of data across the Internet can be subject to delays and can lead to data loss. Therefore, the standby host group may inappropriately take over the processes of the production host group (even if there is no failure in the production host group) because the standby host group may erroneously see a network problem (e.g., link failure or data transmission delay) as a failure state of the production host group.

The host group in the production system may access a storage volume commonly known a primary volume (PVOL) in the associated storage system of the production system host group. Similarly, the host group in the standby system may access a storage volume commonly known a secondary volume (SVOL) in the associated storage system of the standby system host group. The primary volume (PVOL) is mirrored by the secondary volume (SVOL). A storage system may have both PVOLs and SVOLs.

Storage-based remote mirroring technology creates and stores mirrored volumes of data between a given distance. Two disk systems are directly connected by remote links such as an Enterprise System Connectivity (ESCON) architecture, Fibre Channel, telecommunication lines, or a combination of these remote links. The data in the local disk system is transmitted to (via the remote links) and copied in the remote disk system. These remote links are typically highly reliable, in comparison to a usual network such as the Internet. If an unreliable remote link fails, then this failure may disadvantageously result in the loss of data.

U.S. Pat. Nos. 5,459,857 and 5,544,347 both disclose remote mirroring technology. These patent references disclose two disk systems connected by remote links, with the two disk systems separated by a distance. Mirrored data is stored in disks in the local disk system and in the remote disk system. The local disk system copies data on a local disk when pair creation is indicated. When a host server updates data on the disk, the local disk system transfers the data to the remote disk system through the remote link. Thus, host operation is not required to maintain a mirror data image of one disk system in another disk system.

U.S. Pat. No. 5,933,653 discloses another type of data transferring method between a local disk system and a remote disk system. In the synchronous mode, the local disk system transfers data to the remote disk system before completing a write request from a host. In the semi-synchronous mode, the local disk system completes a write request from the host and then transfers the write data to the remote disk system. Subsequent write requests from the host are not processed until the local disk system completes the transfer of the previous data to the remote disk system. In the adaptive copy mode, pending data to be transferred to the remote disk system is stored in a memory and transferred to the remote disk system when the local disk system and/or remote links are available for the copy task.

There is a need for a system and method that will overcome the above-mentioned deficiencies of conventional methods and systems. There is also a need for a system and method that will increase reliability of cluster computing systems and improved failure detection in these computing systems. There is also a need for a system and method that will accurately detect failure in the production host group of a cluster system so that the standby host group is prevented from taking over the processes of the production host group when the production host group has not failed.

SUMMARY

The apparatus and methods described in this invention provide heartbeat-checking mechanisms by using remote mirror technology for cluster computing systems. Once the remote mirrors are created and set up for heartbeat checking functions, a first host sends heartbeat message to another host that is geographically dispersed from the first host. The heartbeat signals are transmitted through a network and/or by use of remote mirrors.

In one embodiment, the present invention broadly provides a cluster computing system, comprising: a production host group; a standby host group coupled to the production host group by a network; and a remote mirror coupled between the production host group and the standby host group, the remote mirror including a production site heartbeat storage volume (heartbeat PVOL) and a standby site heartbeat storage volume (heartbeat SVOL) coupled by a remote link to the heartbeat PVOL, with the production host group configured to selectively send a heartbeat signal to the standby host group by use of at least one of the network and the remote link.

In another embodiment, the present invention enables the bi-directional transmission of a heartbeat signal. The cluster computing system may comprise a second remote mirror coupled between the production host group and the standby host group, the second remote mirror including a second remote link for transmitting a heartbeat signal, and the standby host group is configured to selectively send a heartbeat signal to the production host group by use of at least one of the network and the second remote link.

In another embodiment, the present invention broadly provides a method of checking for failure in a cluster computing system. The method comprises: generating a heartbeat signal from a production host group; selectively sending the heartbeat signal to the standby host group from the production host group by use of at least one of a network and a remote link; and enabling the standby host group to manage operations of the cluster computing system if an invalid heartbeat signal is received by the standby host group from the production host group.

In another embodiment, the present invention provides a method of installing remote mirrors in a cluster computing system. The method comprises: registering a first storage volume to a device address entry, the first storage volume located in a production site; from the production site, changing a remote mirror that includes the first storage volume into an enabled mode; sending an activation message from the production site to a standby site; registering a second storage volume to the device address entry, the second storage volume located in the standby site; and from the standby site, changing the remote mirror into an enabled mode to install a remote mirror formed by the first storage volume and second storage volume.

In another embodiment, the present invention provides a method of de-installing remote mirrors in a cluster computing system. The method comprises: from a production site, changing a remote mirror into a disabled mode; sending a de-activation message from the first production site to a standby site; and from the standby site, changing the remote mirror into a disabled mode to de-install the remote mirror.

In another embodiment, the present invention provides a method of transmitting a heartbeat message from a production site host to a standby site host in a cluster computing system. The method comprises: determining if a network between the production site host and the standby site host is enabled; if the network is enabled, sending a heartbeat message along the network from the production site host to the standby site host; determining if a remote mirror between the production site host and the standby site host is enabled; and if the remote mirror is enabled, sending a heartbeat message along the remote mirror from the production site host to the standby site host.

In another embodiment, the present invention provides a method of receiving a heartbeat message from a production site host to a standby site host in a cluster computing system. The method comprises: determining if a network between the production site host and the standby site host is enabled; if the network is enabled, checking for a heartbeat message along the network from the production site host to the standby site host; determining if a remote mirror between the production site host and the standby site host is enabled; if the remote mirror is enabled, checking for a heartbeat message along the remote mirror from the production site host to the standby site host; and if an invalid heartbeat is received along the network and along the remote mirror, enabling the standby host to manage operations of the cluster computing system.

In another embodiment, the present invention provides a method of setting a heartbeat checking procedure between a primary group and a secondary group in a cluster computing system. The method comprises: providing a request command that determines the heartbeat checking procedure; responsive to the request command, enabling a first heartbeat check module in the primary group to activate or de-activate a network between the primary group and the secondary group; responsive to the request command, enabling the first heartbeat check module to activate or de-activate a remote mirror between the primary group and the secondary group; permitting the first heartbeat check module to send the request command to a second heartbeat check module in the secondary group; responsive to the request command, enabling the second heartbeat check module to activate or de-activate the network between the primary group and the secondary group; responsive to the request command, enabling the second heartbeat check module to activate or de-activate the remote mirror between the primary group and the secondary group; if the second heartbeat check module has activated the network, then checking for a heartbeat signal along the network; and if the second heartbeat check module has activated the remote mirror, then checking for a heartbeat signal along the remote mirror.

The present invention may advantageously provide a system and method that increase the reliability of cluster computing systems and improve failure detection in these computing systems. The present invention may also advantageously provide a system and method that will accurately detect failure in the production host group of a cluster system so that the standby host group is prevented from taking over the processes of the production host group when the production host group has not failed. The present invention may also advantageously provide a system and method that permit a production host group to check for heartbeat signals from a standby host group.

BRIEF DESCRIPTION OF THE DRAWINGS

FIG. 2 is a block diagram showing an example of a Heartbeat Status Table stored in each of the master hosts shown in FIG. 1, in accordance with an embodiment of the present invention;

FIG. 3 is a block diagram showing an example of the data format of a heartbeat message, in accordance with an embodiment of the present invention;

DETAILED DESCRIPTION OF THE PREFERRED EMBODIMENTS

The following description is provided to enable any person skilled in the art to make and use the present invention, and is provided in the context of a particular application and its requirements. Various modifications to the embodiments will be readily apparent to those skilled in the art, and the generic principles defined herein may be applied to other embodiments and applications without departing from the spirit and scope of the present invention. Thus, the present invention is not intended to be limited to the embodiments shown, but is to be accorded the widest scope consistent with the principles, features, and teachings disclosed herein.

Figure 1:
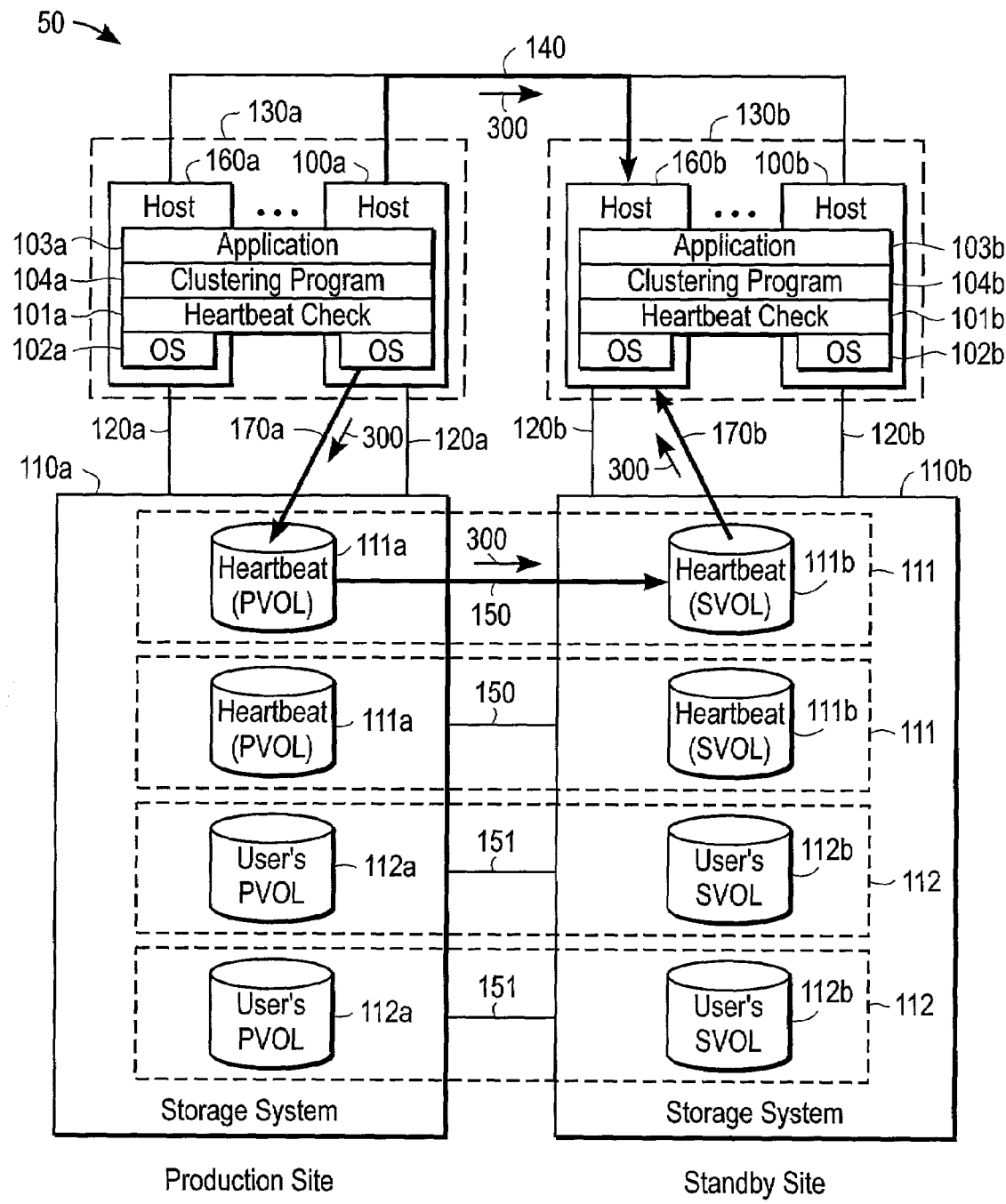
FIG. 1 is block diagram of a system configuration in accordance with an embodiment of the present invention.

FIG. 1 is a block diagram of a system 50 in accordance with an embodiment of the present invention. The system 50 comprises two host groups which are shown as primary group (production host group) 130a and secondary group (standby host group) 130b. The primary group 130a is typically located in a production site and is remote from the secondary group 130b which is typically located in a standby site. The primary group 130a comprises one or more hosts 100a, and the secondary group 130b comprises one or more hosts 100b. The hosts are typically servers.

As known to those skilled in the art, a server is a computer or device on a network that manages network resources. For example, a file server is a computer and storage device dedicated to storing files. Any user on the network can store files on the server. A print server is a computer that manages one or more printers, and a network server is a computer that manages network traffic. A database server is a computer system that processes database queries.

An application 103a normally runs at the primary group 130a, while an application 103b at the secondary group 130b is in the standby mode, as conventionally known in cluster computing systems. When a heartbeat check 101b (in secondary group 130b) determines that the heartbeat check 101a has failed, then application 103a "fails over" to the secondary group 130b in the standby site. In other words, when the application 103a fails over to the secondary group 130b, then the application 103b in the secondary group 130b will run for the system 50.

The application 103a will also fail over to the secondary group 130a and the application 103b will run for system 50 when the heartbeat check 101a determines that it is unable to function any longer; this would occur, for example, when only one host 100a remains functional due to the failure of the other hosts 100a in the primary group 130a, and, as a result, the one remaining functional host 10a is unable to perform assigned tasks by itself. In this instance, the application 103b will run for the system 50 to perform the assigned tasks.

In one embodiment, the heartbeat check 101a and heartbeat check 101b are modules, software programs, firmware, hardware, a combination of these components, or other suitable components.

The clustering programs 104a and 104b permit the hosts 100a and 100b to function as a cluster computing system and are conventionally known programs. The heartbeat check 101a can be separate from the clustering program 104a, or may be combined or attached with the clustering program 104a as one program. Similarly, the heartbeat check 101b can be separate from the clustering program 104b, or may be combined or attached with the clustering program 104b as one program.

The operating system 102a provides APIs (application program interfaces (APIs) for the Clustering Program 104a and the Heartbeat Check 101 to use. For example, the operating system 102a provides "open", "read", "write", and "close" to the storage volumes. Heartbeat Check 101 uses these APIs when, e.g., sending a heartbeat message (e.g., "open(vol)" to get a pointer to the volume, "write(message)" to write a message, and "close (vol)" to discard the pointer).

The paths 120a and 120b in FIG. 1 transmit information between the hosts 100a and the storage system 110a by use of a standard protocol. Examples of the path 120 include SCSI, Fibre channel, ESCON, or Ethernet, which standard protocols are SCSI-3, FCP, ESCON, and TCP-IP, respectively.

Similarly, an operating system 102b performs functions for hosts 100b, as similarly described above with the functions of operating system 102a.

Each host has a Clustering program 104, heartbeat check 101, and operating system 102a. The heartbeat check 101 may be a part of clustering program 104 (not separated). Each operating system 102a works independently. Clustering program 104 (and heartbeat check 101) know the state of other hosts 100 (i.e., if the host is dead or alive). Based on the detected state of the host, the clustering program determines to perform or not perform fail-over.

Each host 100a has its own application 103a if a user specifies accordingly. For example, a Host1 (in hosts 100a) may run an Oracle database, Host2 may run a payroll application, Host3 may run an order entry application, and the like. If Host1 fails, then Oracle database is opened at, e.g., Host2. Thus, Host2 now runs the Oracle database and the payroll application.

The present invention chooses one host in the primary group 130a as a master host 160a, and one host in the secondary group 130b as a master host 160b. As described below, the master hosts 160a and 160b send "heartbeat" signals 300 to each other to determine if a fail over should be performed. Other hosts 100a in primary group 130a may become a master host 160a if the current master host 160a is deemed to fail in following some rules. Some examples of rules may include the following:

(1) The master host 160a did not send a heartbeat message for 1 minute; or (2) The master host 160a sent an invalid message (e.g., the message include an invalid date and time (not current), an invalid ID of the master host, and/or an expired instance (or process) ID of the cluster).

Similarly, other hosts 100b may become a master host 160b in secondary group 130b if the current master host 160b is deemed to fail in following some rules.

All of the hosts 100a (including master host 160a) are connected by a network 140 to all of the hosts 100b (including master host 160b). Thus, any of the hosts 100a in primary group 130a can communicate with any of the hosts 100b in the secondary group 130b. Typically, the network 140 may be a Local Area Network (LAN) or a Wide Area Network (WAN) such as the Internet.

As known to those skilled in the art, a LAN is a computer network that spans a relatively small area. Most LANs are confined to a single building or group of buildings. Most LANs connect workstations and personal computers (PCs). Each node (individual computer) in a LAN has its own central processing unit (CPU) with which it executes programs, but it is also able to access data and devices anywhere on the LAN. Thus, many users can share expensive devices, such as laser printers, as well as data. Users can also use the LAN to communicate with each other, by, for example, sending e-mail or engaging in chat sessions. There are many different types of LANs, with Ethernets being the most common for PCs. LANs are capable of transmitting data at very fast rates, much faster than the data transmitted over a telephone line. However, the distances over LANs are limited, and there is also a limit on the number of computers that can be attached to a single LAN.

As also known to those skilled in the art, a WAN is a computer network that spans a relatively large geographical area. Typically, a WAN includes two or more LANs. Computers connected to a WAN are often connected through public networks, such as the telephone system. They can also be connected through leased lines or satellites. The largest WAN in existence is the Internet.

Through the network 140, the master hosts 160a and 160b can send a heartbeat signal to each other. The network 140 also permits master host 160a and 160b to perform heartbeat checking with each other. In other words, the master host 160a can check whether the master host 160b is alive (functional) or not by checking for a heartbeat signal from the master host 160b, as described below. Similarly, the master host 160b can check whether the master host 160a is alive or not by checking for a heartbeat signal from the master host 160a, as described below.

The primary group 130a is coupled to a storage system 110a in the production site, and the secondary group 130b is coupled to a storage system 110b in the standby site. Each of the storage systems 110a and 110b form, for example, a disk system. Each of the storage systems 110a and 110b comprises two or more disks. The storage systems 110a and 110b are connected to each other by one or more remote links 150 through which the storage systems 110a and 110b communicate with each other. Typically, the remote links 150 may be ESCON, Fibre Channel, telecommunications lines, or a combination that may include ESCON, Fibre Channel, and telecommunication lines.

As known to those skilled in the art, ESCON is a set of products, e.g., from IBM, that interconnect S/390 computers with each other and with attached storage, locally attached workstations, and other devices using optical fiber technology and dynamically modifiable switches called ESCON Directors.

As also known to those skilled in the art, Fibre Channel is a serial data transfer architecture developed by a consortium of computer and mass storage device manufacturers and now being standardized by the American National Standards Institute (ANSI). The most prominent Fibre Channel standard is the Fibre Channel Arbitrated Loop (FC-AL) which is designed for new mass storage devices and other peripheral devices that require very high bandwidth. Using optical fiber to connect devices, FC-AL supports full-duplex data transfer rates of 100 megabytes per second (MBps).

The disk system (formed by storage systems 110a and 110b) forms a remote data mirroring system and comprises one or more remote mirror 111. Each remote mirror 111 comprises a storage volume (heartbeat PVOL) 111a in storage system 110a and a storage volume (heartbeat SVOL) 111b in storage system 110b. When the heartbeat check 101a writes a heartbeat message 300 to the heartbeat PVOL 111a, the storage system 110a then writes the heartbeat message 300 to the heartbeat SVOL 111b via remote link 150. The heartbeat check 101b then reads the heartbeat signal 300 from the heartbeat SVOL 111b to check if the hosts 100a are alive.

The number of remote mirrors 111, heartbeat PVOLs 111a, heartbeat SVOLs 111b, and remote links 150 (linking a heartbeat PVOL 111a with a heartbeat SVOL 111b) may vary. A heartbeat PVOLs 111a may fail due to hardware problems. The use of two or more heartbeat PVOLs 111a for use by heartbeat signals 300 advantageously achieves higher reliability for the system 50.

The heartbeat check 101a writes the heartbeat message 300 via path 170a to the heartbeat PVOL(s) 111a by use of, for example, a Small Computer System Interface (SCSI) driver. SCSI is a parallel interface standard used by Apple Macintosh computers, PCs, and many UNIX systems for attaching peripheral devices to computers. SCSI interfaces provide for faster data transmission rates (up to about 80 megabytes per second) than standard serial and parallel ports. The storage system 110a sees the heartbeat signal 300 as a write data. The storage system 100a stores the heartbeat signal 300 in heartbeat PVOL(s) 111a and also transmit the heartbeat signal 300 along remote link 150 by use of a conventional driver or transceiver (not shown in FIG. 1).

The heartbeat signal 300 is received by a conventional remote copy mechanisms in the storage system 110b and written to the SVOL(s) 111b. The heartbeat check 101b then reads the heartbeat signal 300 data stored in the heartbeat SVOL(s) 111b via path 170b by use of conventional APIs that the operating system provides.

The heartbeat check 101a (in master server 160a) sends a heartbeat signal 300 at pre-determined intervals such as, for example, every second, every 10 seconds, every 60 seconds, etc. The heartbeat check 101a sends a heartbeat signal 300 along the path 170a to one or more heartbeat PVOL(s) 111a as described above. In addition to being able to send heartbeat signals 300 via remote link 150, the heartbeat check 101a can also simultaneously send heartbeat signals 300 along network 140 to the hosts 100b.

The disk system (formed by storage systems 110a and 110b) further comprises one or more remote mirror 112 for storing production data. Each remote mirror 112 comprises a storage volume (user's PVOL 112a) and a storage volume (user's SVOL 112b). As an example, a user's PVOL 112a or 112b comprises a database such as a database available from Oracle Corporation. The user's PVOL 112a or 112b may also be storage volumes for storing data from the World Wide Web, text files, and the like. When the application 103a updates data on the user's PVOL 112a, the storage system 110a writes the data to the user's SVOL 112b by use of a conventional remote copy mechanism to transmit the data across the remote link 151 to storage system 110b. The storage system 110b receives the data transmitted along remote link 151 by use of a conventional remote copy mechanisms, and the received data is then written into the user's SVOL 112b. Hosts 100b (including master host 160b) access the user's SVOL(s) 112b to read stored data after fail-over to secondary group 130b occurs. In other words, if failure occurs in the production site so that the primary group 130a is unable to perform assigned operations or tasks, then the hosts 100b in the secondary group 130b in the standby site will perform the operations and tasks for system 50. Examples of failures that may trigger a fail-over includes host failure, storage system or disk failure, applications or software failure, hardware failure, signal paths or connections failure, and other types of failures in the production site that will prevent the host group 130a from performing assigned operations or tasks for system 50.

As known to those skilled, mirrored volumes containing production data (e.g. user database) are sometimes broken manually by having the user issue a break (split) command. The mirrored volumes are broken for purposes of, for example, performing backup tasks, running other applications or jobs on the user's SVOL(s) 112b, and the like. A user (in the production site) may issue a split (break) command, to prevent the user's PVOL 112a from sending via remote link 151 data to user's SVOL 112b. In other words, a split command prevents the storage system 110a from sending data to the storage system 110b.

Thus, the remote mirror 111 is separate from the remote mirror 112 because the remote mirror 111 should not be subject to a split command. As stated above, the heartbeat PVOL 111a sends via remote link 150 the heartbeat signals 300 to the heartbeat SVOL 111b. A split command would disadvantageously prevent the heartbeat PVOL 111a from sending via remote link 150 the heartbeat signals 300 to the heartbeat SVOL 111b. By separating the remote mirrors 111 and 112, the heartbeat PVOL 111a can continue to send the heartbeat signals 300 to the heartbeat SVOL 111b via remote link 150 even if the user issues a split command that prevents the user's PVOL 112a from sending data to the user's SVOL 112b via remote link 151.

This invention prevents the user from using mirrors 112 containing production data for the heartbeat checking tasks, and may also alert the user if he/she tries to break the mirrored volumes before de-installing the mirrored volumes 111 for heartbeat signals.

Tables

Heartbeat Status Table 250: FIG. 2 is a block diagram of a Heartbeat Status Table 250 stored in each of the master hosts 160a and 160b. The Heartbeat Status Table 250 is stored in both the memory in a host and a volume. The volume prefers to be remotely mirrored (so is the PVOL). The table 250 is used by Heartbeat check 101a. The heartbeat check 101a running on master host 160a will create, refer to, and change a Heartbeat Status Table 250. Similarly, the heartbeat check 101b running on master host 160b will create, refer to, and change another Heartbeat Status Table 250 in the master host 160b. When another one of the hosts 100a becomes the master host 160a, the hosts 100a will also create, refer to, and change an associated Heartbeat Status Table 250. Similarly, when another one of the hosts 100b becomes the master host 160b, the hosts 100b will also create, refer to, and change an associated Heartbeat Status Table 250.

As discussed in detail below, the Heartbeat Status Table 250 comprises: Network Heartbeat Enable 200, Remote Group Status 210, Remote Copy Heartbeat Enable 220, Remote Group Status 230, Device Addresses (1), (2), . . . (n) 240, and Device Status (1), (2), . . . (n) 241.

The Network Heartbeat Enable 200 shows whether the network 140 can be used for transmitting a heartbeat signal 300. Possible values include the following: "ENABLE", "DISABLE", and "FAILED". The entry "ENABLE" indicates that the user has enabled the system 50 to permit a heartbeat signal 300 to transmit across network 140. When user specifies not to use the network 140 for heartbeat, Network Heartbeat Enable 200 turns this entry into "DISABLE". The user can permit or disable the sending of heartbeat signals 300 across the network 140 by issuing commands in the master host 160a. When the heartbeat check 101a (or 101b) finds unrecoverable errors in system 50, then the heartbeat check 101a turns the Network Heartbeat Enable 200 entry into "FAILED". The heartbeat check 101a (or 101b) does not use the network 140 for checking heartbeat signals if the Network Heartbeat Enable 200 shows the entries of "DISABLE" or "FAILED".

The Remote Group Status 210 shows, from the result of a heartbeat check performed via network 140, whether the other group (remote host group 130b) is alive (functional) or not. For example, the Remote Group Status 210 entry stored in the master host 160a at the production site shows the status of at least one of the hosts 100b at the standby site. The status of the entry in the Remote Group Status 210 depends on the heartbeat checking performed via network 140. If the hosts 100b in the standby site is functioning, then the entry in the Remote Group Status 210 is shown as "ALIVE". If there is failure in the network 140 or remote group 130b, or failure in any component that makes remote group 130b non-functional, then the entry in the Remote Group Status 210 will show "FAILED".

Remote Copy Heartbeat Enable 220 shows if the remote mirrors 111 used for heartbeat signals 300 are available. Possible values for the Remote Copy Heartbeat Enable 220 entry are "ENABLE", "DISABLE", or "FAILED". When the user specifies to use one or more remote mirrors 111 for sending heartbeat signals 300, then the entry in the Remote Copy Heartbeat Enable 220 will show "ENABLE". When the user specifies not to use any of the remote mirrors 111 for heartbeat signals 300, then the entry in the Remote Copy Heartbeat Enable 220 will show "DISABLE". When all remote mirrors 111 are disabled or have failed, then the entry in the Remote Copy Heartbeat Enable 220 will show "FAILED". As discussed below, the entry in the Device Status 241 will show whether each of the remote mirrors 111 are enabled or disabled.

The results of performing a heartbeat check via a remote mirror 111 shows whether the remote group 130b is alive (functional) or non-functional. The Remote Group Status 230 shows the results of the heartbeat check. The status of this entry in the Remote Group Status 230 depends only on performing the heartbeat checking via remote mirrors 111. If all of the remote links 150 fail or all remote mirrors 111 fail, then a heartbeat signal 300 via remote mirrors 111 cannot reach the remote group 130b from the primary group 130a. As a result, the entry in the Remote Group Status 230 will show "FAILED".

Device Address 240 shows a device address of a mirror 111 for a heartbeat signal 300. For example, an entry in device address 240 is stored in master host 160a and contains a device address of a heartbeat PVOL 111a. The heartbeat check 101a will write heartbeat signals 300 to the heartbeat PVOLs 111a in a remote mirror 111 with an addresses listed in device address 240 of the associated heartbeat status table 250 in the master host 160a. This same type of entry in the device address 240 is also stored in master host 160b and contains the same device address of the remote mirror 111 with the heartbeat SVOL 111b. The heartbeat check 101b will read heartbeat signals 300 stored in the heartbeat SVOLs 111b in the mirror 111 with the address listed in the device address 240.

Device Status 241 shows a status of the device (heartbeat mirror 111) that is registered with Device Address 240. The value in the Device Status 241 entry may include "ENABLE", "DISABLE", or "FAILED". When a user deactivates a particular mirror 111 or a failure occurs in that particular mirror 111, the Device Status 241 of that particular mirror 111 will show "DISABLE" or "FAILED", and the heartbeat check 101a does not use that particular failed mirror for the heartbeat signal 300 transmission. As shown in FIG. 2, there are two or more entries (240a, 240b, . . . 240c) in the Device Address 240 and two or more entries (241a, 241b, . . . 241c) in the Device Status 241 for two or more mirrors 111 for processing the heartbeat signal 300. In other words, entries 240a and 241a are associated with a mirror 111, while entries 240b and 241b are associated with another mirror 111. Unused entries in the Heartbeat Status Table 250 contain "NULL".

Heartbeat Message 300

The master host 160a at the primary site sends a heartbeat message (or signal) 300 to the master host 160b at the standby site through the network 140 and/or through the heartbeat mirror 111. When using the mirror 111 to send the heartbeat messages 300, the master host 160a writes this heartbeat message 300 to the heartbeat PVOL 111a, and the master host 160b reads the transmitted heartbeat message 300 from the heartbeat SVOL 111b.

FIG. 3 is a block diagram showing an example of the data format of a heartbeat message. A heartbeat message 300 includes at least some of the following entries. A Serial Number 310 is a number serially assigned to the heartbeat message 300. In one embodiment, this number increments (or counts up) by one (1) for each heartbeat message 300 that is sent, and the value of the serial number is re-initialized to 1 for the next heartbeat message 300 that is sent after a heartbeat message with the maximum value of the serial number 310 is sent. A Time 320 contains the time when the Heartbeat check 101a running on a master host 160a generates a heartbeat message 300. An identifier 330 is used to identify the sender of the message. This identity may be, for example, a unique number assigned to the heartbeat check 101a running at the primary site, a name uniquely assigned to the heartbeat check 101a that is sending the heartbeat message 300, the Internet Protocol (IP) address of the master host 160a, or combination of the above identifications.

Figure 4:
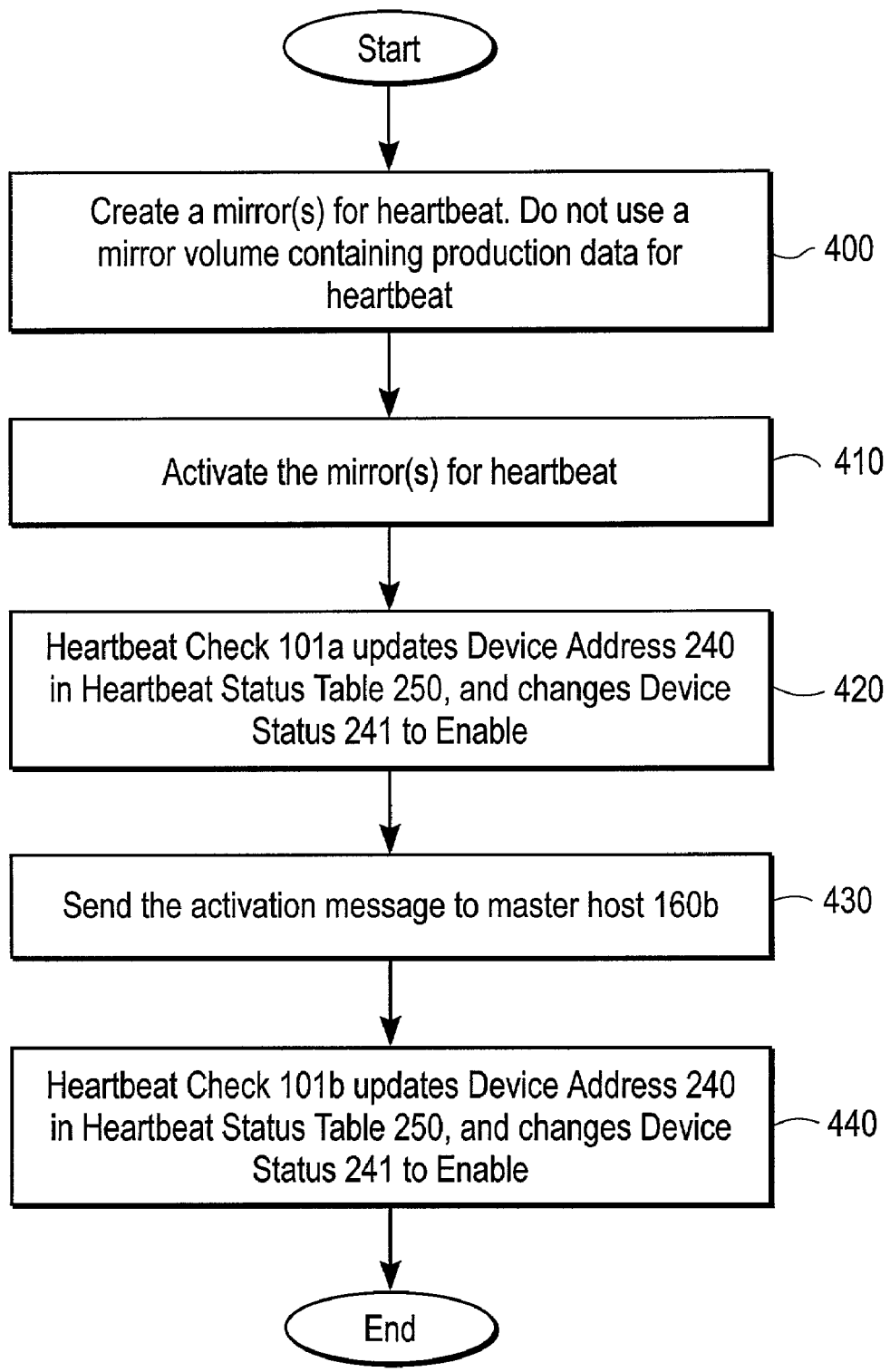
FIG. 4 is a flowchart diagram illustrating a method of installing a mirror used for heartbeat signals, in accordance with an embodiment of the present invention.

Method of Installing Mirrors Used for Heartbeat Signals (See FIG. 4)

As stated above, the heartbeat mirrors 111 used for heartbeat signals 300 are different from the production data mirrors 112 used for storing the production data. This is because the production mirrors 112 may be broken manually for other purposes, such as performing a backup from SVOL, running other jobs or applications on SVOL, etc.

FIG. 4 is a flowchart diagram illustrating a method of installing a heartbeat mirror 111 used for heartbeat signals 300. The heartbeat check 101a provides a user interface for creating 400 heartbeat mirrors 111 used for the transmission and storage of heartbeat signals 300. The heartbeat check 101a also provides the user interface to control the mirrors 111, such as, for example, the creation, deletion, and the breaking (splitting) of mirrors 111. As previously noted, the mirrors 112 (which contain production data) are not used for heartbeat signal 300 transmission and processing. The heartbeat check 101a provides the user interface to activate and/or deactivate mirrors 111 for heartbeat signal 300 transmission or processing. Using this user interface, a user can activate 410 any or all of the heartbeat mirrors 111. The input parameters for the user interface are, for example, the heartbeat PVOL device 111a address and the heartbeat SVOL device 111b address. In this step 410, if a mirror 111 has not been created, then the heartbeat check 101a halts the process and displays on the user interface an alert message, such as "no mirror is created".

Once the user activates 410 the heartbeat mirror 111, in step 420 the heartbeat check 101a running on the master host 160a registers the heartbeat PVOL 111a (in activated mirror 111) to the Device Address 240 (FIG. 2), and changes Device Status 241 to "ENABLE" in Heartbeat Status Table 250 (FIG. 2). Before performing this step 420, the heartbeat check 101a displays an alert message in the user interface that production data should not be placed in the mirrors 111 used for the heartbeat signals 300. The heartbeat check 101a then sends 430 to the heartbeat check 101b running on the standby site the following: an activation message along with the parameters. These parameters include the address of the SVOL 111b in the mirror 111 to be activated. The heartbeat check 101a sends this activation message via network 140 or by using a heartbeat mirror 111 that is already available. When the heartbeat check 101b, running on the standby site, receives the activation message sent by heartbeat check 101a in step 430, then in step 440 the heartbeat check 101b registers the heartbeat SVOL(s) 111b to the Device Address 240 and changes the Device Status 241 to "ENABLE" in Heartbeat Status Table 250. Thus, the heartbeat mirror 111 is now installed, and the heartbeat check 101a can now send heartbeat signals 101b to the heartbeat check 101b via remote link 150. It is noted that a plurality of mirrors may be installed when the method shown in FIG. 4 is performed.

Figure 5:
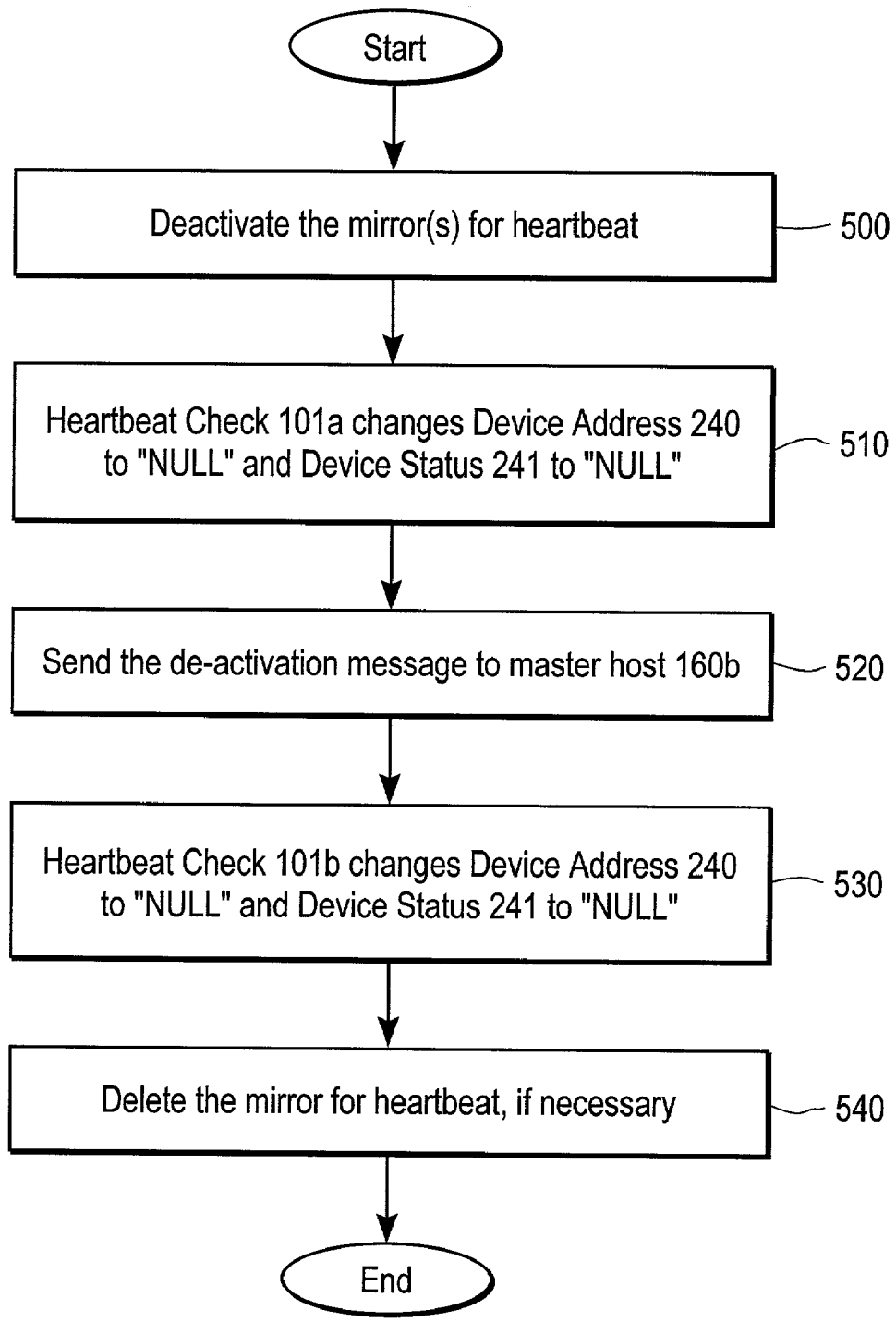
FIG. 5 is a flowchart diagram illustrating a method of deinstalling a mirror used for heartbeat signals, in accordance with an embodiment of the present invention.

Method of De-installing Mirrors 111 Used for Heartbeat Messages 300 (See FIG. 5)

The user may want to de-install a mirror 111 that is being used for the heartbeat messages 300. For example, the user may decide to decrease the number of mirrors 111 used for heartbeat messages 300 since the performance of heartbeat checking degrades if many mirrors 111 are used for transmitting and processing heartbeat messages 300.

FIG. 5 is a flowchart diagram of a method of de-installing a mirror 111 used for heartbeat messages 300. The user de-activates a mirror (or mirrors) 111 by using the user interface provided by the heartbeat check 101a. The heartbeat check 101a, running at the production site, de-activates 500 the particular mirror(s) 111 specified by the user. To de-activate the particular mirror(s) 111 specified by the user, the heartbeat check 101a changes 510 the entries in the Device Address 240 and Device Status 241 in the Heartbeat Status Table 250 (FIG. 2) to "NULL". The heartbeat check 101a then sends 520 a deactivation message along with the parameters to the heartbeat check 101b running at the standby site. These parameters are device address of SVOL(s). The de-activation message is sent is via network 140 or by using any mirror 111 that is still available for transmitting signals. The heartbeat check 101b, running at the standby site, de-activates the particular mirror(s) 111 specified in step 500 by the user. To de-activate the particular mirror(s) 111, the heartbeat check 101b changes 530 the associated entries in the Device Address 240 and Device Status 241 in the Heartbeat Status Table 250 to "NULL". If the user no longer needs to use the de-activated mirror(s) 111, he/she can delete 540 the mirror(s) 111 using a known user interface provided by storage system vendors. Deactivating a mirror prohibits the Heartbeat Check to use the mirror for sending a heartbeat message, but the mirror is still formed (the PVOL and SVOL relationship is still valid). Deleting a mirror actually deletes the mirror. Thus, the mirror relationship no longer exists. A User may need to delete mirrors for some reasons (e.g., to increase performance and the like). In such cases, the user should deactivate the mirrors before deleting the mirrors, in order for the Heartbeat Check to not try to send a message via the deleted mirrors.

It is also noted that when the user tries to break (split) a heartbeat mirror(s) 111 and if the particular heartbeat mirror(s) 111 is not de-installed, then the heartbeat check 101a will not break the particular heartbeat mirror(s) 111 until the mirror(s) is de-installed. This insures that an installed heartbeat mirror 111 will not be split.

Figure 6:
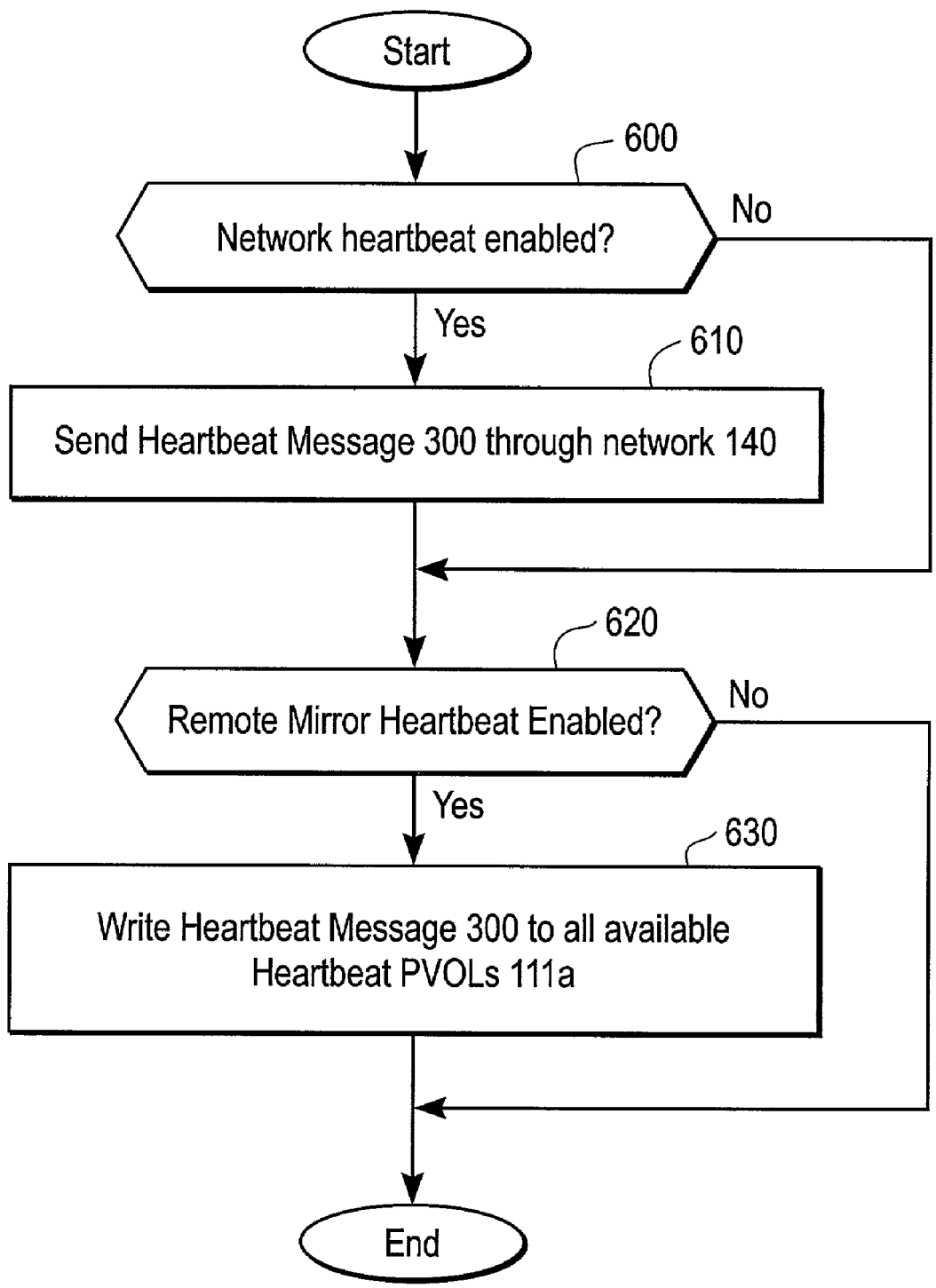
FIG. 6 is a flowchart diagram illustrating a method of sending a heartbeat message, in accordance with an embodiment of the present invention.

Method of Sending a Heartbeat Message 300 (see FIG. 6)

FIG. 6 is a flowchart diagram of a method of sending a heartbeat message 300 in accordance with an embodiment of the present invention. The heartbeat check 101a sends periodically, for example, every one-minute, a heartbeat message 300 to the heartbeat check 101b as shown in this flowchart. The user can specify the interval during which a heartbeat message 300 is transmitted.

The heartbeat check 101a first determines 600 whether the network 140 can be used for transmitting a heartbeat signal 300. The Network Heartbeat Enable 200 (FIG. 2) entry in the Heartbeat Status Table 250 shows whether the network 140 can be used for transmitting a heartbeat signal 300. If the network 140 can be used for transmitting a heartbeat signal 300, then the Network Heartbeat Enable 200 entry will indicate "ENABLE". In this case, the heartbeat check 101a sends 610 a heartbeat message 300 via network 140. To create a heartbeat message 300, the heartbeat check 101a increments the current value of a Serial Number 310 (FIG. 3), obtains the current time from a timer in the operating system 102a, and places these information into the heartbeat message 300 along with a predetermined identifier 330.

If, in step 600, the network 140 can not be used for transmitting heartbeat signals 300 (i.e., the Network Heartbeat Enable 200 entry does not indicated "ENABLE"), then the method proceeds to step 620 which is discussed below.

As stated above, the Remote Copy Heartbeat Enable 220 entry in the Heartbeat Status Table 250 (FIG. 2) shows if the remote mirrors 111 used for heartbeat signals 300 are available. When the user specifies to use all the remote mirrors 111 for heartbeat signals 300, then the entry in the Remote Copy Heartbeat Enable 220 will show "ENABLE". When the user specifies not to use all of the remote mirrors 111 for heartbeat signals 300, then the entry in the Remote Copy Heartbeat Enable 220 will show "DISABLE". When all remote mirrors 111 are disabled or have failed, then the entry in the Remote Copy Heartbeat Enable 220 will show "FAILED".

The heartbeat check 101a checks 620 if the Remote Copy Heartbeat Enable 220 entry shows "ENABLE" (i.e., at least one remote mirror 111 is available for use by the heartbeat messages 300. If so, then the heartbeat check 101a sends the heartbeat message 300 via remote link 150. If the Remote Copy Heartbeat Enable 220 entry does not show "ENABLE" (i.e., all remote mirrors are unavailable for use by the heartbeat messages 300), then the method ends. Thus, "ENABLE" shows at least one remote mirror is available, and "DISABLE" shows all remote mirrors are unavailable. A message cannot be sent when "DISABLE" is shown.

The heartbeat check 101a writes 630 a heartbeat message 300 to all available heartbeat PVOLs 111a. To check if a heartbeat PVOL(s) 111a is available, the heartbeat check 101a checks the status of every entry of Device Status 241 in Heartbeat Status Table 250 to determine all mirrors 111 that are available. The heartbeat check 101a then writes the heartbeat message 300 to the heartbeat PVOL devices 111a in the available mirrors 111. As stated above, a mirror 111 is available if its associated entry show "ENABLE" in the Device Status 241. The heartbeat check 101a does not send heartbeat signals 300 to the heartbeat PVOL devices 111a that are in mirrors 111 that are unavailable. As stated above, a heartbeat mirror 111 is unavailable if it has an associated entry of "NULL" in the Device Status 241.

If a network 140 failure occurs while the heartbeat check 101a is sending a heartbeat message 300, then the Network Heartbeat Enable 200 entry will indicate "FAILED". If a device (heartbeat mirror 111) failure occurs while the heartbeat check 101a is writing a heartbeat message 300 to a heartbeat mirror 111, then the Device Status 241 entry for that failed mirror will indicate "FAILED". At this time, the heartbeat check 101a checks the other entries of Device Status 241 (i.e., the heartbeat check 101a checks if other heartbeat mirrors 111 are available so it can determine which other heartbeat PVOLs 111a may be used for the processing of the heartbeat signals 300). The heartbeat check 101a will indicate the entry in the Remote Copy Heartbeat Enable 220 as "FAILED" if all the entries of Device Status 241 show either "FAILED", "DISABLE", or "NULL".

Figure 7:
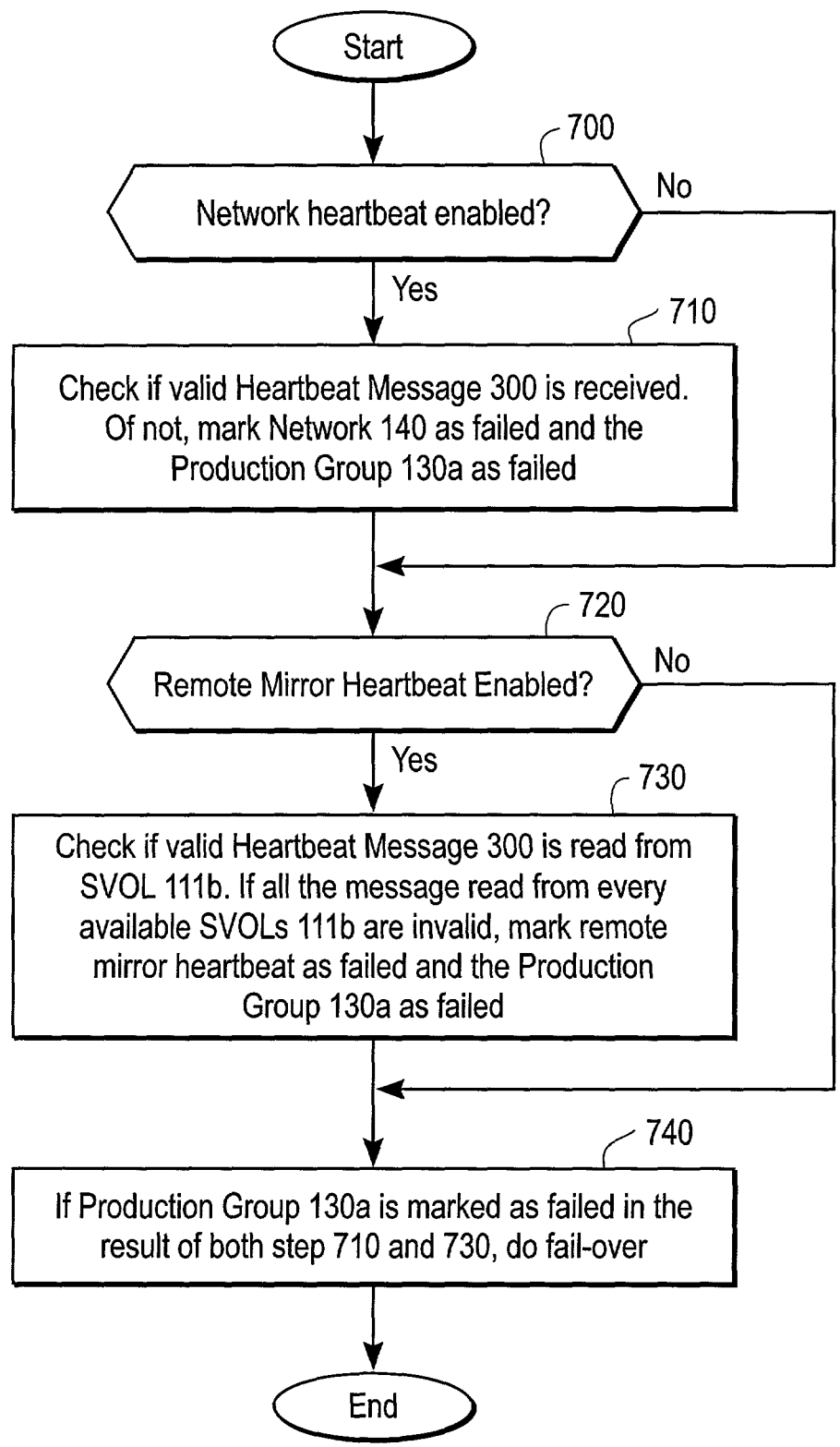
FIG. 7 is a flowchart diagram illustrating a method of receiving a heartbeat message, in accordance with an embodiment of the present invention.

Method of Receiving a Heartbeat Message 300 (See FIG. 7)

The heartbeat check 101b (of master host 160b) periodically receives and checks for heartbeat messages 300 sent by the heartbeat check 101a. If there is one or more heartbeat mirrors 111 that is functioning, then the heartbeat check 101b reads from each heartbeat SVOL 111b (in each functioning heartbeat mirror 111) until the heartbeat check 101b finds a valid heartbeat message 300 stored in at least one of the heartbeat SVOLs 111b.

The definition of the valid heartbeat message 300 includes one or more of the following:

(1) Based on the Identifier 330 in a heartbeat message 300, the heartbeat check 101b approves the heartbeat message 300 sent from the Heartbeat check 101a;

(2) The Serial Number 310 is continuously incremented within a timeout period (e.g., one minute); and (3) The Time 320 is continuously updated within a timeout period.

Other definitions of a valid heartbeat may also be made, as specified by the user.

It is noted further that the above condition (1) specifies that the sender of a message is a member (host) of a cluster. Within a cluster, each host knows and can identify the members of the cluster. Thus, the receiver of a message can identify whether the message is sent from a member of the cluster.

It is noted further that in the above condition (2), a receiver observes messages sent by a sender. If the serial number 310 is not incremented within, say, one minute, then the sender is deemed as failed.

It is noted further that in the above condition (3), a receiver observes messages sent by a sender. If Time 320 is not updated within, say, one minute, then the sender is deemed as failed.

Referring now to FIG. 7, there is shown a flowchart diagram of a method of receiving a heartbeat message 300 in accordance with an embodiment of the present invention. The heartbeat check 101b checks 700 if the network 140 can be used for transmission of heartbeat signals 300 (i.e., if the Network Heartbeat Enable 200 entry in Heartbeat Status Table 250 shows "ENABLE"). If the network 140 can be used for heartbeat signals 300, then the heartbeat check 101b checks 710 if a valid heartbeat message 300 has been received via network 140. If a valid heartbeat message 300 has not been received, then the heartbeat check 101b skips its checking of heartbeat signals 300 received via network 140 and marks the network 140 and production group 130a as having failed by changing the entries in Network Heartbeat Enable 200 and Remote Group Status 210 as "FAILED". This indicates that after the heartbeat check 101b checked the network 140 for the heartbeat signals 300, the production group 130a and the network 140 are regarded as having failed. As a result, the failed network 140 is not used for heartbeat checking operations by heartbeat check 101b.

The heartbeat check 101b checks 720 if the remote mirrors 111 used for heartbeat signals 300 are available. If the Remote Mirror Heartbeat Enable 220 entry shows "ENABLE", then the heartbeat check 101b checks 730 for a received heartbeat message 300 by checking at least one remote mirror 111 which is available. If none of the remote mirrors 111 are available, then the heartbeat check 101b skips the heartbeat checking operation via remote mirror(s) 111 and proceeds to step 740 which is discussed below.

The heartbeat check 101b reads 730 a heartbeat message 300 from each heartbeat SVOL 111b. If the heartbeat check 101b finds a valid heartbeat message 300, then the standby host group 130b will not take over operations for the production group 130a, since the production group 130a is deemed as alive (has not failed). On the other hand, if the heartbeat check 101b finds all the heartbeat messages 300 as invalid, then the heartbeat check 101b marks the entries in the Remote Copy Heartbeat Enable 220 and Remote Group Status 230 as "FAILED". This indicates that production group 130a and all remote mirrors 111 are regarded as having failed based upon the result of the heartbeat checking via remote mirroring, and all remote mirrors 111 are not used for heartbeat checking from then on.

If the heartbeat check 101b finds a particular remote mirror 111 that contains an invalid heartbeat message 300, then the heartbeat check 101b marks the Device Status 241 entry associated with that particular remote mirror 111 as "FAILED". As a result, the heartbeat SVOL 111b in that remote mirror 111 is not used for process of heartbeat checking by use of the remote mirrors.

After the above steps has been performed, the Heartbeat Status Table 250 (FIG. 2) will contain the results of the heartbeat checking via network 140 and heartbeat checking by use of remote mirroring. If neither the Remote Group Status 210 nor the Remote Group Status 230 shows the entry "ALIVE", then Heartbeat check 101b regards production group 130a as dead and will perform 740 the fail-over operation as described above. As a result of the fail-over operation, the standby group 130b will assume operation of the system 50 of FIG. 1.

Non-stop Addition and Deletion of Heartbeat Mirrors 111

It is advantageous if the addition and deletion of a heartbeat mirror(s) 111 are performed without affecting the heartbeat checking operation described above. To achieve this feature, the clustering system 50 (FIG. 1) starts to use each newly-created mirror volumes 111a and 111b in a new heartbeat mirror 111. The system 50 stops in using existing mirror volumes 111a and 111b in each heartbeat mirror 111 deleted by the user.

As described in FIG. 4, when installing a heartbeat mirror 111 for use by heartbeat messages 300, the heartbeat is checks 101 (101a and 101b) register information of the newly-created heartbeat mirror 111 to vacant entries (containing "NULL") in Device Address 240 (e.g., Device Address 204c) and in Device Status 241. On the other hand, as described above with regard to FIG. 6 and FIG. 7, the heartbeat checks 101 (101a and 101b) do not use the vacant entries in the Device Address 240 and Device Status 241. This is the same procedure when deleting a heartbeat mirror 111. The heartbeat checks 101 will stop using a heartbeat mirror 111 that is deleted or deinstalled. Thus, the heartbeat checks 101 do not need to be stopped in its processing of heartbeat signals 300, while the heartbeat checks 101 are adding (or are deleting) a heartbeat mirror 111.

Figure 8:
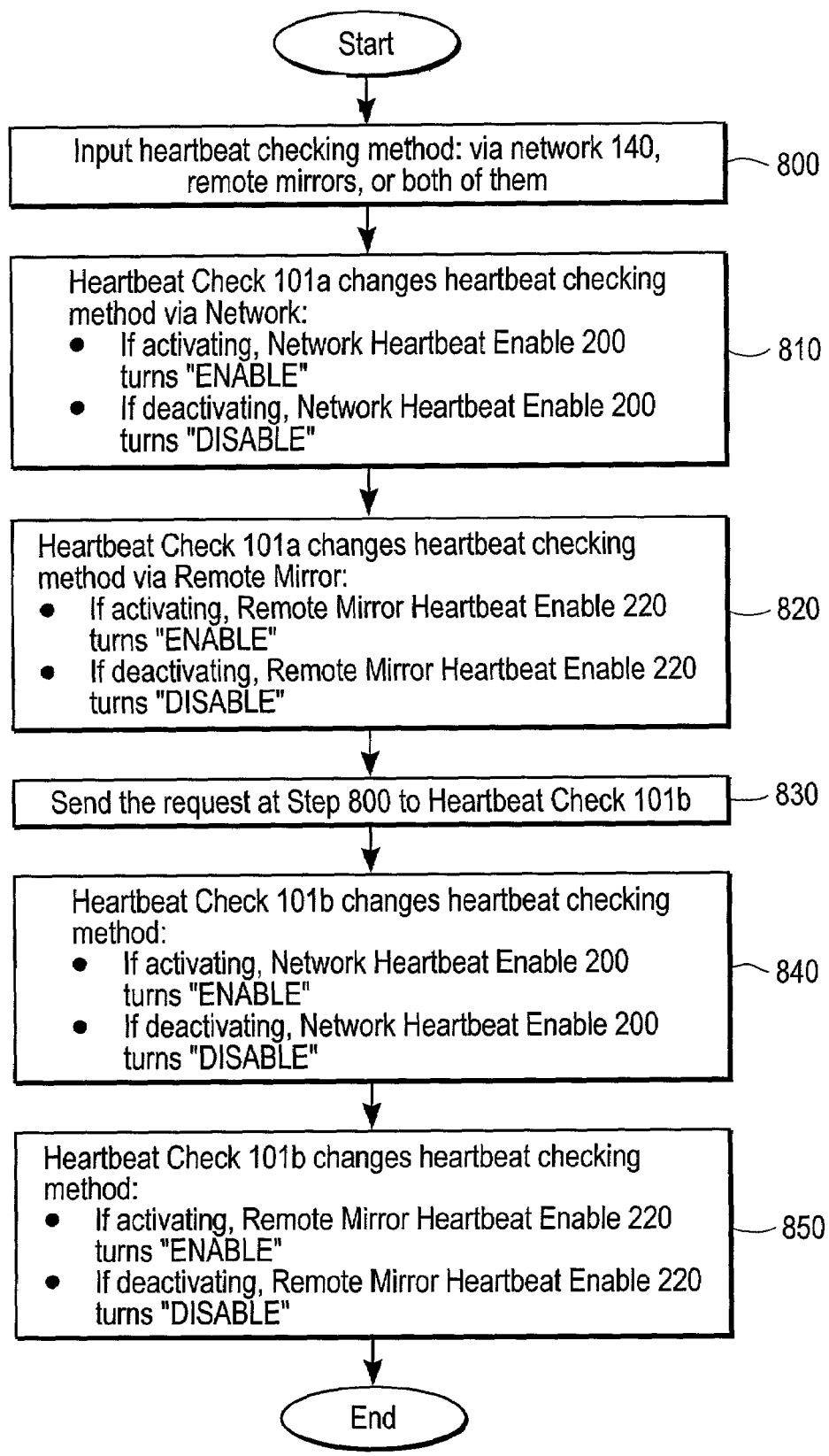
FIG. 8 is a flowchart diagram illustrating a method of setting the heartbeat checking procedure, in accordance with an embodiment of the present invention.

Method for Setting the Heartbeat Checking Procedure (FIG. 8)

There are three methods for sending heartbeat messages 300 from the primary group 130a to the standby group 130b (or from the standby group 130b to the primary group 130a). The heartbeat messages 300 can be selectively sent: (1) through the network 140, (2) through at least one remote mirrors 111, or (3) through both the network 140 and at least one remote mirror 111. The user can choose one of these methods for sending the heartbeat messages 300. When the user indicates a method for sending the heartbeat messages 300, the heartbeat check 101a updates the Heartbeat Status Table 250 without affecting heartbeat checking operation.

Changing the procedure for sending the heartbeat messages 300 is very useful when the network 140 or the remote mirrors 111 are being diagnosed, and or when regular maintenance work is being performed.

FIG. 8 is a flowchart diagram illustrating a method of setting the heartbeat checking procedure in accordance with an embodiment of the present invention. The user first requests 800 to change of the heartbeat checking procedure by indicating if the heartbeat messages will be sent by use the network 140, by use of the remote mirrors 111, or by use of both the network 140 and the remote mirrors 111. This request indicates that the network 140 and the remote mirrors 111 for checking heartbeat messages 300 are enabled or disabled.

Once a heartbeat checking procedure is indicated by the user's request, the heartbeat check 101a and 101b will execute the following. The user's request will activate (or deactivate) 810 the network 140 for heartbeat checking operations. The value of the Network Heartbeat Enable 200 entry will be as follows: If the user is activating the heartbeat checking via network 140, then the entry in the Network Heartbeat Enable 200 will be "ENABLE". The heartbeat check 101a will send heartbeat signals 300 along the network 140. If the user is deactivating the heartbeat checking via network 140, then the entry in the Network Heartbeat Enable 200 will be "DISABLE". The heartbeat check 101a will not send heartbeat signals 300 along the network 140.

The user's request will activate (or deactivate) 820 a remote mirror 111 for heartbeat checking operations. The value of Remote Copy Heartbeat Enable 220 entry will be as follows: If the user is activating the heartbeat checking via remote mirror 111, then the entry in the Remote Copy Heartbeat Enable 220 will be "ENABLE". The heartbeat check 101a will send heartbeat signals 300 via remote mirrors 111. If the user is deactivating the heartbeat checking via remote mirror 111, then the entry in the Remote Copy Heartbeat Enable 220 will be "DISABLE". The heartbeat check 101a will not send heartbeat signals 300 via remote mirrors 111.

The heartbeat check 101a sends 830 the user's request (made in step 800) to the heartbeat check 101b. This request is sent via network 140 or a remote mirror 111 that is currently available.

The heartbeat check 101b then performs 840 and 850 a similar process described in steps 810 and 820. Specifically, The user's request will activate (or deactivate) 840 the network 140 for heartbeat checking operations. The value of the Network Heartbeat Enable 200 entry will be as follows: If the user is activating the heartbeat checking via network 140, then the entry in the Network Heartbeat Enable 200 will be "ENABLE". The heartbeat check 101b can check for heartbeat signals 300 along the network 140. If the user is deactivating the heartbeat checking via network 140, then the entry in the Network Heartbeat Enable 200 will be "DISABLE". The heartbeat check 101b will not be able to check for heartbeat signals 300 along the network 140.

The user's request will activate (or deactivate) 850 a remote mirror 111 for heartbeat checking operations. The value of Remote Copy Heartbeat Enable 220 entry will be as follows: If the user is activating the heartbeat checking via remote mirror 111, then the entry in the Remote Copy Heartbeat Enable 220 will be "ENABLE". The heartbeat check 101ab can check for heartbeat signals 300 via remote mirrors 111. If the user is deactivating the heartbeat checking via remote mirror 111, then the entry in the Remote Copy Heartbeat Enable 220 will be "DISABLE". The heartbeat check 101b will not be able to check for heartbeat signals 300 via remote mirrors 111.

It is also possible to activate or deactivate a remote mirror 111, or a set of remote mirrors 111 (i.e., not all remote mirrors 111). To do this, the heartbeat check 101a (in step 820) and heartbeat check 101b (in step 850) changes the entry in the Device Status 241 for an associated remote mirror(s) 111 to "ENABLE" (if activating the mirror 111)" or to "DISABLE" (if deactivating the remote mirror 111).

Figure 9:
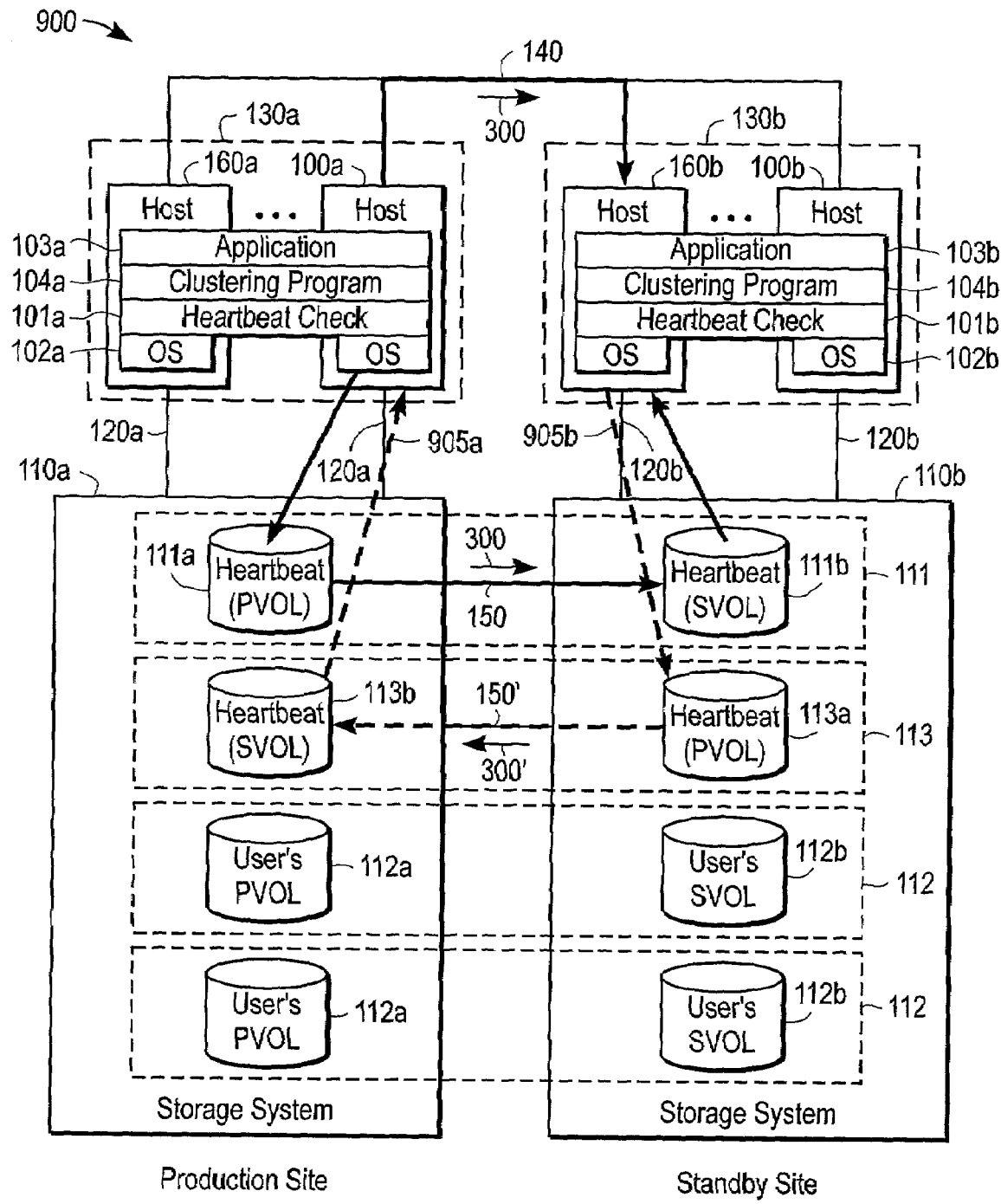
FIG. 9 is block diagram of a system configuration in accordance with another embodiment of the present invention.

Bi-directional Heartbeat Messages (See FIG. 9)

Reference is now made to FIG. 9 which illustrates a block diagram of a system 900 in accordance with another embodiment of the present invention. A cluster system may require the checking of heartbeat signals in a bi-directional manner. Thus, the production group 130a may want to know whether the standby group 130b is available or not available. For example, the user at the production site may want to check the availability of the standby group 130b. Thus, a bi-directional heartbeat mechanism would be useful in this instance. For this bi-directional mechanism in accordance with an embodiment of the present invention, other mirrored volumes are created: a heartbeat PVOL 113a at the standby site and a heartbeat SVOL 113b at the production site. The heartbeat PVOL 113a and heartbeat SVOL 113b are in the mirror 113. The master host 160b in the standby group 130b writes a heartbeat signal 300' to the heartbeat PVOL(s) 113a and the master host 160a in the production group reads the heartbeat signal 300' from the heartbeat SVOL(s) 113b to check if the standby group 130b is alive.

In this embodiment, the heartbeat check 101a not only sends heartbeat messages 300 but also receives heartbeat messages 300' from the heartbeat check 101b to check if the heartbeat check 101a is alive. To implement this embodiment, as shown in FIG. 9, the remote mirror 113 is created, where the heartbeat PVOL 113a is in the storage system 110b at standby site, and the heartbeat SVOL 113b is in the storage system 110a at production site. The number of remote mirrors 113, heartbeat PVOLs 113a, heartbeat SVOLs 113b, and remote links 150' (linking a heartbeat PVOL 113a with a heartbeat SVOL 113b) may vary.

For the system 900 shown in FIG. 9, the user installs a remote mirror 113 for transmitting heartbeat messages 300' from the storage system 110b to the storage system 110a via remote link 150'. The heartbeat check 101b writes a heartbeat signal 300' to the heartbeat PVOL 113a, and the storage system 110b writes the heartbeat signal 300' to the heartbeat SVOL 113b via the remote link 150'. The heartbeat check 101a can read the heartbeat signal 300' from the heartbeat SVOL 113b.

All tables mentioned above may be used in this embodiment. Additionally the mechanisms or methods such as the installing and de-installing mirrors 113', the sending of heartbeat messages 300', the receiving heartbeat messages 300', and the setting a heartbeat checking procedure for heartbeat signals 300' are performed similarly to the methods relating the heartbeat signals 300. For example, to carry out the functional operations for heartbeat signals 300', the roles or functions of the heartbeat check 101a and heartbeat check 101b are reversed in FIGS. 4, 5, 6, 7, and 8.

Figure 10:
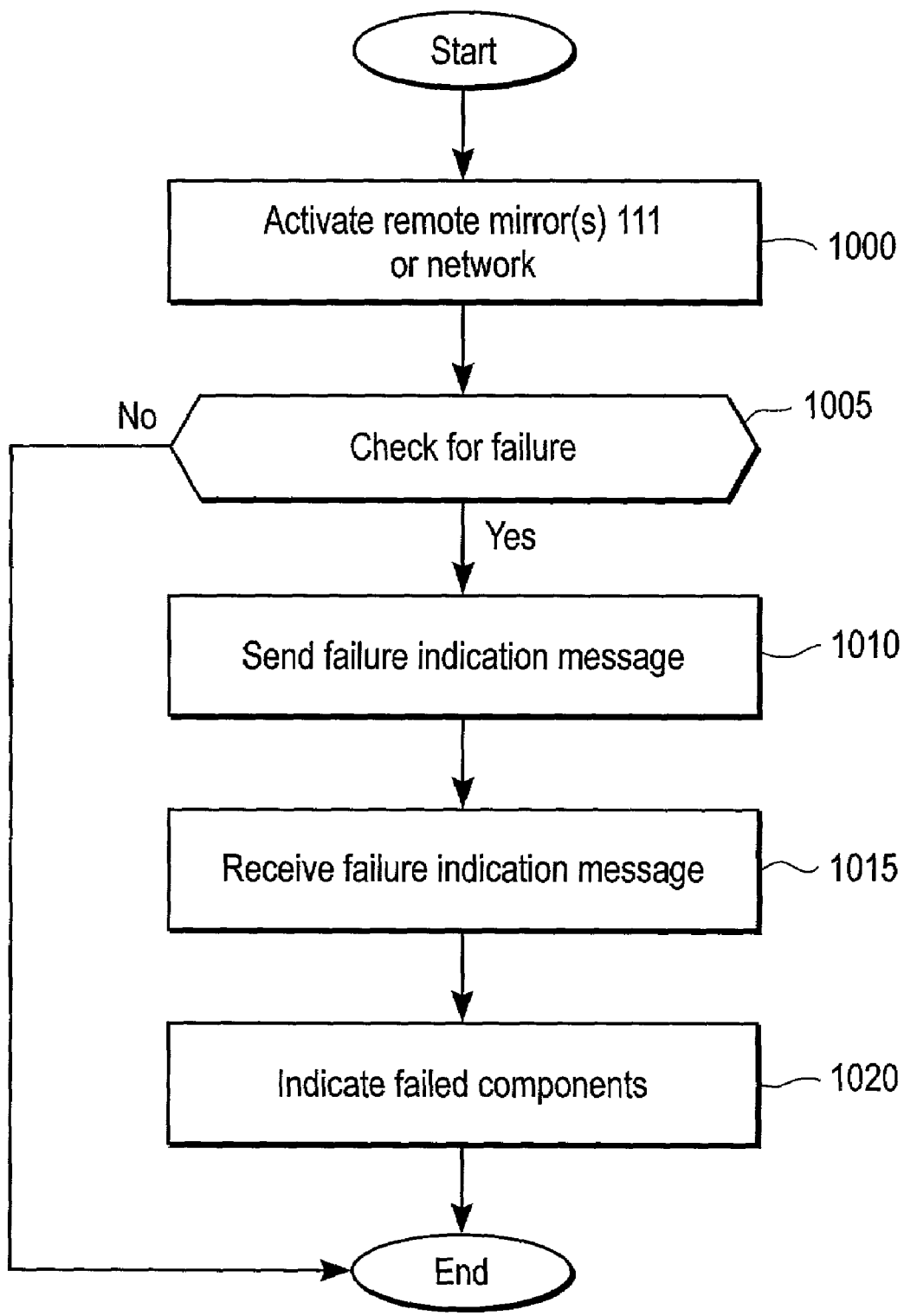
FIG. 10 is a flowchart diagram illustrating a method of failure notification in accordance with an embodiment of the present invention.

FIG. 10 is a flowchart diagram illustrating a method of failure notification in accordance with an embodiment of the present invention. This method can be performed by, for example, the system 50 in FIG. 1. A remote mirror(s) 111 and/or the network 140 are activated 1000 so that the primary group 130a can selectively send a failure indication message 1100 (FIG. 11) along the activated remote mirror(s) 111 and/or along the network 140. The mirror(s) 111 may be activated in the same manner as previously described above. A check 1005 for failure can be made in the host group 130a. Components in the host group 130a have uniquely assigned serial numbers for purposes of identification. An IP address will work for this purpose. For example, each server 100a has a unique identification number. The storage system 110a (or 110b) has a unique identification number. The storage volumes PVOLs 111a and PVOLs 112a also have uniquely assigned identification numbers and uniquely assigned addresses. If a component fails, then the heartbeat check 101a is configured to determine the component identification number of that failed component.

In one embodiment, the heartbeat message 1100 (FIG. 11) includes the following information:

(1) Failed parts information 1105 (shows failed parts, such as a failed host, network, disk drive, others): This information may be the ASCII character code, or the number uniquely assigned to the parts.

(2) Level of failure 1120 (one of the values of "SYSTEM DOWN", "SERIOUS", "MODERATE", or "TEMPORALLY"): Based on this information, the alert action will differ. For example, if the level of failure is "SYSTEM DOWN" or "SERIOUS", then the level of failure is notified to the system manager by phone at any time. If the level of failure is "TEMPORALLY", then the information is just logged or recorded.

(3) Parts information 1110 describes detailed information about the failed parts): For example, if the failed part is a host, then the parts information shows the IP Address of the failed host. If the failed part is a drive, then the parts information shows the drive serial number.

The heartbeat check 101a is also configured to determine an address of the failed component. For example, the heartbeat check 101a will determine the address of a failed storage volume PVOL 112a. Additionally, the heartbeat check 101a may record the time of failure of a component.

The heartbeat check 101a then sends 1010 a failure indication message 1100 (FIG. 11) via remote mirror 111 and/or via network 140 in a manner similar to the transmission of heartbeat signals 300 as described above. After the failure indication message 1100 is received 1015 by the heartbeat check 101b, then heartbeat check 101b can read the failure indication message and display information in the master host 160b interface concerning the failure in the primary group 130a. This display information may include, for example, the identity of the failed component, the address of the failed component, and the time during which failure of the component was detected.

Figure 11:
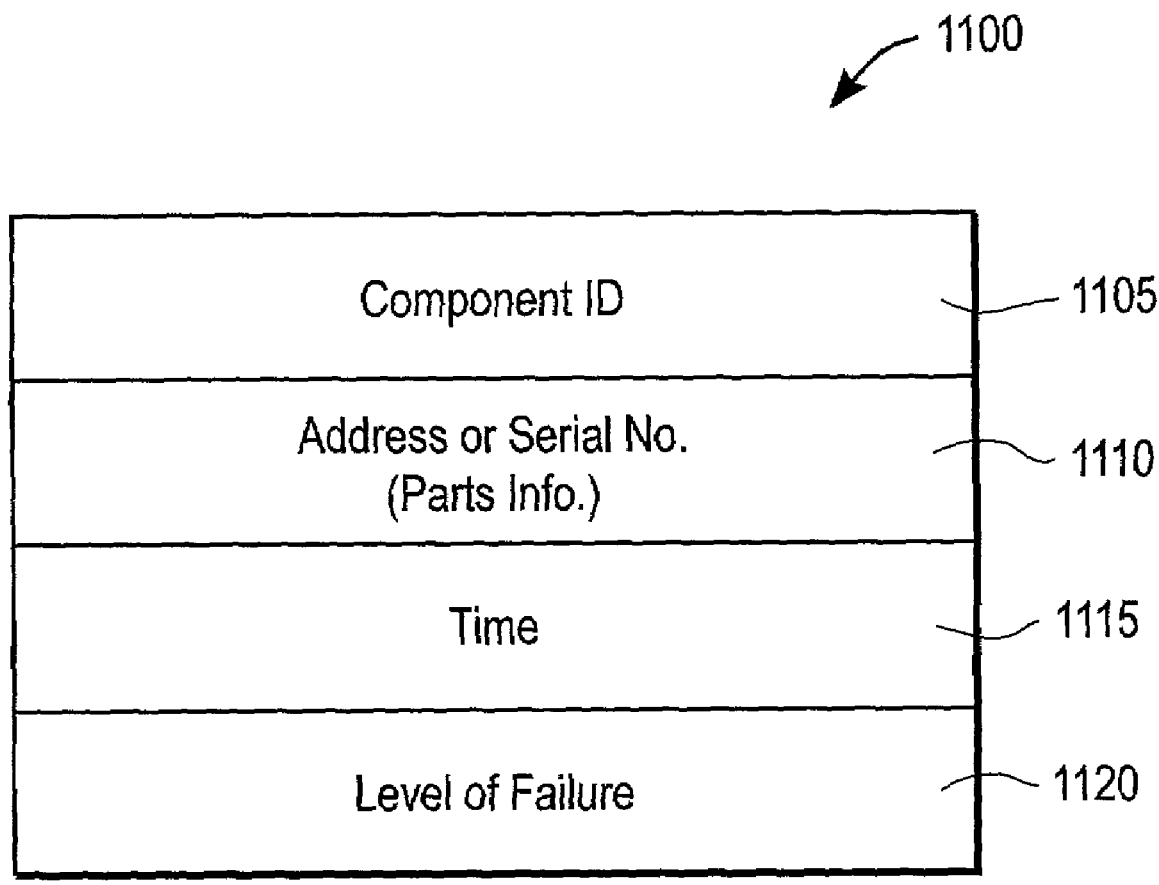
FIG. 11 is a block diagram illustrating an example of a format of a failure indication message in accordance with an embodiment of the present invention.

FIG. 11 is a block diagram illustrating an example of a format of a failure indication message 1100 in accordance with an embodiment of the present invention. As stated above, the failure indication message 1100 may include the unique component identification number 1105 the failed component, parts information (e.g., an address) 1110 of the failed component, and the time 1115 during which the failure of the component was detected.

It is also within the scope of the present invention to implement a program or code that can be stored in an electronically-readable medium to permit a computer to perform any of the methods described above.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. An apparatus for sending a heartbeat signal in a cluster computing system, the apparatus comprising:
    a first host group; and
    a first storage system comprising a first heartbeat storage volume and a first data storage volume, the first storage system being associated with the first host group, the first host group coupled via a network to a second host group, the first storage system coupled via a remote link separate from the network to a second storage system comprising a second heartbeat storage volume and a second data storage volume, the second storage system being associated with the second host group, the first host group configured to selectively send a heartbeat signal to the second host group by use of the remote link by sending a memory command to the first heartbeat storage volume of the first storage system which is mirrored via the remote link using a remote copy mechanism to the second heartbeat storage volume of the second storage system, wherein the second host group is configured to use the received heartbeat signal to determine whether a failover should be performed; and wherein:
    the first heartbeat storage volume and second heartbeat storage volume form a remote minor being in an enabled mode;
    the first heartbeat storage volume is registered to a device address entry;
    the first host group operable to send an activation message to the second host group; and
    the second heartbeat volume is registered to the device address entry.

2. A method of sending a heartbeat signal in a cluster computing system, the method comprising:
    a. generating a heartbeat signal from a first host group in a production site, the first host group being associated with a first storage system comprising a first heartbeat storage volume and a first data storage volume;
    b. installing remote mirrors in the cluster computing system, including:
        registering the first heartbeat storage volume to device address entry, and, from the production site, changing a remote mirror that includes the first heartbeat storage volume into an enabled mode;
        sending an activation message from the production site to a standby site;
        registering a second heartbeat storage volume of a second storage system to the device address entry, the second heartbeat storage volume located in the standby site; and
        from the standby site, changing the remote mirror into enabled mode to install a remote mirror formed by the first heartbeat storage volume and second heartbeat storage volume;
    c. selectively sending the heartbeat signal from the first host group to a second host group by use of the remote mirror formed by the first heartbeat storage volume and the second heartbeat storage volume, the heartbeat signal being sent from the first heartbeat storage volume of the storage system via the remote link to the second heartbeat storage volume of the second storage system using a remote copy mechanism, wherein the second host group uses the received heartbeat signal to determine whether a failover should be performed.

3. An electronically-readable medium storing a program for permitting a computer to perform method of sending a heartbeat signal in a cluster computing system, the method comprising:
    generating a heartbeat signal from a first host group in a production site, the first host group being associated with a first storage system comprising a first heartbeat storage volume and a first data storage volume;
    b. installing remote mirrors in the cluster computing system, including:
        registering the first heartbeat storage volume to a device entry, and, from the production site, changing a remote mirror that includes the first heartbeat storage volume into an enabled mode;
        sending an activation message from the production site to a standby site;
        registering a second heartbeat storage volume of a second storage system to the device address entry, the second heartbeat storage volume located in the standby site; and
        from the standby site, changing the remote mirror into an enabled mode to install a remote mirror formed by the first heartbeat storage volume and second heartbeat storage volume;
    c. selectively sending the heartbeat signal from the first host group to a second host group by use of the remote mirror formed by the first heartbeat storage volume and the second heartbeat storage volume, the heartbeat signal being sent from the first heartbeat storage volume of the first storage system via the remote link to the second heartbeat storage volume of the second storage system using a remote copy mechanism, wherein the second host group uses the received heartbeat signal to determine whether a failover should be performed.

4. A program code stored on an electronically-readable medium for causing a computer to perform a method of sending a heartbeat signal in a cluster computing system, the method comprising:
    a. generating a heartbeat signal from a first host group in a production site, the first host group being associated with a first storage system comprising a first heartbeat storage volume and a first data storage volume;
    b. Installing remote mirrors in the cluster computing system, including:
        registering the first heartbeat storage volume to a device address entry, and, from the production site, changing a remote mirror that includes the first heartbeat storage volume into an enabled mode;
        sending an activation message from the production site to a standby site;

registering a second heartbeat storage volume of a second storage system to the device address entry, the second heartbeat storage volume located in the standby site; and from the standby site, changing the remote mirror into an enabled mode to install a remote minor formed by the first heartbeat storage volume and second heartbeat storage volume;

c. selectively sending the heartbeat signal from the first host group to a second host group by use of the remote mirror formed by the first heartbeat storage volume and the second heartbeat storage volume, the heartbeat signal being sent from the first heartbeat storage volume of the first storage system via the remote link to the second heartbeat storage volume of the second storage system using a remote copy mechanism, wherein the second host group uses the received heartbeat signal to determine whether a failover should be performed.

5. A method of checking for failure in a cluster computing system, the method comprising:

a. generating a heartbeat signal from a first host group in production site associated with a first storage system comprising a first heartbeat storage volume and a first data storage volume;

b. installing remote mirrors in the cluster computing system, including:

registering the first heartbeat storage volume to a device address entry, and from the production site, changing a remote mirror that includes the first heartbeat storage volume into an enabled mode;

sending an activation message from the production site to a standby site;

registering a second heartbeat storage volume of a second storage system to the device address entry, the second heartbeat storage volume located in the standby site; and from the standby site, changing the remote mirror into an enabled mode to install a remote mirror formed by the first heartbeat storage volume and second heartbeat storage volume;

c. selectively sending the heartbeat signal from the first host group to a second to host group by use of the remote mirror formed by the first heartbeat storage volume and the second heartbeat storage volume, the heartbeat signal being sent from the first heartbeat storage volume of the first storage system via the remote mirror the second heartbeat storage volume of the second storage system using a remote copy mechanism, wherein the second host group uses the received heartbeat signal to determine whether a failure has occurred.

6. A cluster computing system, comprising:

a production host group associated with a production storage system comprising a production site heartbeat storage volume (heartbeat PVOL) and a production site data storage volume;

a standby host group coupled to the production host group by a network and associated with a standby storage system comprising a standby site heartbeat storage volume (heartbeat SVOL) and a standby site data storage volume; and a remote mirror coupled between the production host group and the standby host group, the remote minor including the heartbeat PVOL and the heartbeat SVOL coupled by a remote link to the heartbeat PVOL, the remote mirror being separate from the network;

the production host group configured to selectively send a heartbeat signal to the standby host group by use of the remote link using a remote copy mechanism, wherein the standby host group uses the received heartbeat signal to determine whether a failover should be performed and wherein:

the remote mirror being in an enabled mode;

the heartbeat PVOL is registered to a device address entry;

the production host group is operable to send an activation message to the standby host group; and the heartbeat SVOL is registered to the device address entry.

7. The cluster computing system of claim 6 wherein the production host group comprises a first heartbeat check module configured to generate the heartbeat signal.

8. The duster computing system of claim 6 wherein the standby host group comprises a second heartbeat check module configured to receive the heartbeat signal.

9. The cluster computing system of claim 6 wherein the standby host group manages operations of the cluster computing system if an invalid heartbeat signal is received by the standby host group from the production host group.

10. The cluster computing system of claim 6 wherein the heartbeat message comprises: a serial number assigned to the heartbeat message, a time indicator indicating a time of the generation of the heartbeat message, and an Identifier identifying a sender of the heartbeat message.

11. The cluster computing system of claim 6 further comprising:

a second remote minor coupled between the production host group and the standby host group, the second remote mirror including a second remote link for transmitting a heartbeat signal;

the standby host group configured to selectively send a heartbeat signal to the production host group by use of the second remote link.

12. A method of checking for failure in a cluster computing system, the method comprising:

a. generating a heartbeat signal from a production host group in a production site associated with a first storage system comprising a first heartbeat storage volume and a first data storage volume;

b. installing remote mirror in the cluster computing system, including:

registering the first heartbeat storage volume to a device address entry, and, from the production site, changing a remote mirror that includes the first heartbeat storage volume into an enabled mode;

sending an activation message from the production site to a standby site;

registering a second heartbeat storage volume of a second storage system to the device address entry, the second heartbeat storage volume located in the standby site; and from the standby site, changing the remote minor into an enabled mode to install a remote mirror formed by the first heartbeat storage volume and second heartbeat storage volume;

c. selectively sending the heartbeat signal to a standby host group in the standby site from the production host group in the production site by use of the remote mirror formed by the first heartbeat storage volume and the second heartbeat storage volume using a remote copy mechanism;

d. determining, by the standby host group, that a failure has occurred, if an invalid heartbeat signal is received by the standby host group from the production host group; and e. enabling the standby host group to manage operations of the cluster computing system if the failure has occurred.

13. The method of claim 12 further comprising:

selectively sending a heartbeat signal to the production host group from the standby host group by use of a second remote link.

14. The method of claim 12 further comprising:

de-installing remote mirrors in the cluster computing system, including:

from a production site, changing a remote mirror into a disabled mode;

sending a de-activation message from the first production site to a standby site; and from the standby site, changing the remote mirror into a disabled mode to de-install the remote minor.

15. The method of claim 12 wherein the selectively sending step comprises:

determining if a network between the production site host and the standby site host is enabled;

if the network is enabled, sending a heartbeat message along the network from the production site host to the standby site host;

determining if a remote mirror between the production site host and the standby site host is enabled; and if the remote mirror is enabled, sending a heartbeat message along the remote mirror from the production site host to the standby site host.

16. The method of claim 12 further comprising:

receiving a heartbeat message from the production site host to the standby site host in the cluster computing system, including;

determining ifs network between the production site host and the standby site host is enabled;

if the network is enabled, checking for a heartbeat message along the network from the production site host to the standby site host;

determining if a remote minor between the production site host and the standby site host is enabled;

if the remote mirror is enabled, checking for a heartbeat message along the remote mirror from the production site host to the standby site host; and if an invalid heartbeat is received along the network and along the remote minor, enabling the standby host to manage operations of the cluster computing system.

* * * * *